United States Patent [19]

Say

[11] 4,251,494
[45] Feb. 17, 1981

[54] PROCESS FOR REMOVING ACIDIC COMPOUNDS FROM GASEOUS MIXTURES USING A TWO LIQUID PHASE SCRUBBING SOLUTION

[75] Inventor: Geoffrey R. Say, Baton Rouge, La.

[73] Assignee: Exxon Research & Engineering Co., Florham Park, N.J.

[21] Appl. No.: 106,097

[22] Filed: Dec. 21, 1979

[51] Int. Cl.³ .............................................. B01D 53/34
[52] U.S. Cl. .................................... 423/228; 423/232; 423/234
[58] Field of Search ................. 423/228, 229, 232, 234

[56] References Cited

U.S. PATENT DOCUMENTS

| | | | |
|---|---|---|---|
| 2,886,405 | 5/1959 | Benson et al. | 423/232 X |
| 4,094,957 | 6/1978 | Sartori et al. | 423/223 |
| 4,112,050 | 9/1978 | Sartori et al. | 423/223 |
| 4,112,051 | 9/1978 | Sartori et al. | 423/223 |
| 4,112,502 | 9/1978 | Sartori et al. | 423/228 |

Primary Examiner—Earl C. Thomas
Attorney, Agent, or Firm—Edward H. Mazer

[57] ABSTRACT

An improved process for removing carbon dioxide from a gaseous feed including carbon dioxide is described. The carbon dioxide is removed from a gaseous feed by contacting the feed in a contacting zone with a scrubbing solution comprising a sterically hindered amine and an alkali metal shalt or alkali metal hydroxide, which at least partially absorbs the carbon dioxide. The scrubbing solution subsequently is desorbed and separated into a two-phase liquid system, an upper phase relatively rich in sterically hindered amine and having a relatively high ratio of alkali bicarbonate to alkali carbonate and a lower liquid phase having a relatively low ratio of alkali bicarbonate to alkali carbonate. The lower liquid phase is returned to the contacting zone at a location above that at which the upper liquid phase is returned to the contacting zone.

11 Claims, 1 Drawing Figure

PROCESS FOR REMOVING ACIDIC COMPOUNDS FROM GASEOUS MIXTURES USING A TWO LIQUID PHASE SCRUBBING SOLUTION

BACKGROUND OF THE INVENTION

1. Field of the Invention

This invention is directed at a process for removing an acidic compound from a gaseous mixture. More particularly, this invention is directed to a process for removing $CO_2$, from a gaseous mixture containing the $CO_2$ by contacting the gaseous mixture with a two liquid phase scrubbing solution comprising an upper liquid phase comprising a sterically hindered amine-rich liquid stream having a relatively high alkali bicarbonate to carbonate ratio and a lower liquid phase having relatively low alkali bicarbonate to alkali carbonate ratio.

2. Description of the Prior Art

In petroleum and petrochemical processing, the feedstocks often contain acidic compounds such as $CO_2$, $H_2S$, $SO_2$, $SO_3$, $CS_2$, HCN, COS, and the oxygen and sulfur derivatives of $C_1$ to $C_4$ hydrocarbons. Environmental regulations frequently limit emissions of the sulfur-containing compounds. It is also desirable to reduce the concentration of $CO_2$ in the gaseous feedstocks, since $CO_2$ may be corrosive to process equipment or it may be necessary to remove the $CO_2$ to increase the concentration of the other components in the gas stream. In the manufacture of LNG it is necessary to remove $CO_2$ down to very low levels to prevent the formation of solid $CO_2$. Accordingly, the acidic compounds often are removed from gaseous feedstocks by passing the feedstock including the acidic compounds through an acid gas removal step.

Where the bulk removal of an acidic compound is desired and the feed gas pressures are relatively high, one process typically used is conventionally referred to as the "aqueous base scrubbing process" or "hot potash" process. In this process, the acid-containing feedstock is passed upwardly in an absorber while an acid-gas absorbing scrubbing solution containing an alkaline compound, such as a potassium compound, is passed downwardly. The scrubbing solution is then passed to a desorber, or regenerator, where at least a portion of the acidic compound is stripped off. Means for reducing the capital and operating costs of these systems recently have been directed at alkali metal scrubbing solutions having improved absorptive and desorptive capacities. U.S. Pat. No. 4,112,050, is directed at the discovery that the incorporation of a sterically hindered amine, i.e., an amine containing at least one secondary or tertiary carbon atom or a primary amine group attached to a tertiary carbon atom, improves the efficiency of the scrubbing process. U.S. Pat. No. 4,112,051 is directed at the use of a sterically hindered amine and a solvent for the amine. U.S. Pat. No. 4,094,957 teaches that when sterically hindered amines selected from the group consisting of aminoethers, amino-alcohols, di- and triamines are used in a "hot potash" $CO_2$ containing acid gas scrubbing process, phase separation of the scrubbing solution often occurs under acid gas-lean conditions, particularly during desorption. Frequently, phase separation was found to occur when the rate of conversion of the potassium carbonate to potassium bicarbonate was less than about 30%.

Previously, it has been thought that phase separation should be avoided in scrubbing systems since this complicated the scrubbing system operation. Variations in the composition of the scrubbing solution recirculated to the absorber resulted in fluctuations in the concentration of acid gas remaining in the exiting treated gas. Moreover, phase separation also resulted in variations of the heat duty required as the composition in the reboiler varied. As a result, affirmative steps typically have been taken to prevent phase separation. These steps have included:

1. Incompletely desorbing the scrubbing solution to keep the scrubbing solution in the one phase region. However, this increases the capital and operating costs of the system; or
2. Adding a co-solvent, typically an amino acid having four to eight carbon atoms, to prevent phase separation. However, amino acids are relatively expensive, particularly when periodic addition of make-up scrubbing solution to the system is required.

Moreover, prior art scrubbing systems frequently do not reduce the concentration of the acidic compound in the treated gas to relatively low levels without excessive increases in the scrubbing solution circulation rate and in the reboiler duty.

It is, therefore, advantageous to utilize a scrubbing process which does not utilize cosolvents and which can be operated for substantially complete desorption of the scrubbing solution. It is also advantageous to provide a scrubbing process which reduces the acid concentration in the treated gas to sufficiently low levels.

It has been found that, where a scrubbing system comprising a sterically hindered amine and an alkali metal salt, or an alkali metal hydroxide is operated such that the at least partially desorbed solution forms a two phase liquid, addition of the two phases to selected spaced-apart locations in the absorber results in a reduced concentration of the acidic compound in the treated gas.

SUMMARY OF THE INVENTION

This invention is directed at a process for at least partially removing carbon dioxide from a gaseous feed including carbon dioxide comprising:

A. contacting the gaseous feed in a contacting zone with a scrubbing solution comprising:
  (I) an alkaline material selected from the class consisting of alkali metal salts and alkali metal hydroxides; and
  (II) a sterically hindered amine to thereby at least partially absorb the carbon dioxide;

B. passing the aqueous scrubbing solution containing the absorbed acidic compound from the contacting zone into a regeneration zone wherein the scrubbing solution is at least partially desorbed;

C. separating the at least partially desorbed scrubbing solution into an upper liquid phase having a relatively high alkali bicarbonate to alkali carbonate ratio and a lower liquid phase having a relatively low alkali bicarbonate to alkali carbonate ratio; and D. directing at least a portion of the lower liquid phase into the contacting zone at a first location and at least a portion of the upper liquid phase into the contacting zone at a second location, the second location disposed below the first location on the contacting zone.

BRIEF DESCRIPTION OF THE DRAWING

The FIGURE is a flow sheet illustrating one embodiment for practicing the subject invention.

DETAILED DESCRIPTION OF THE INVENTION

Figure 1:
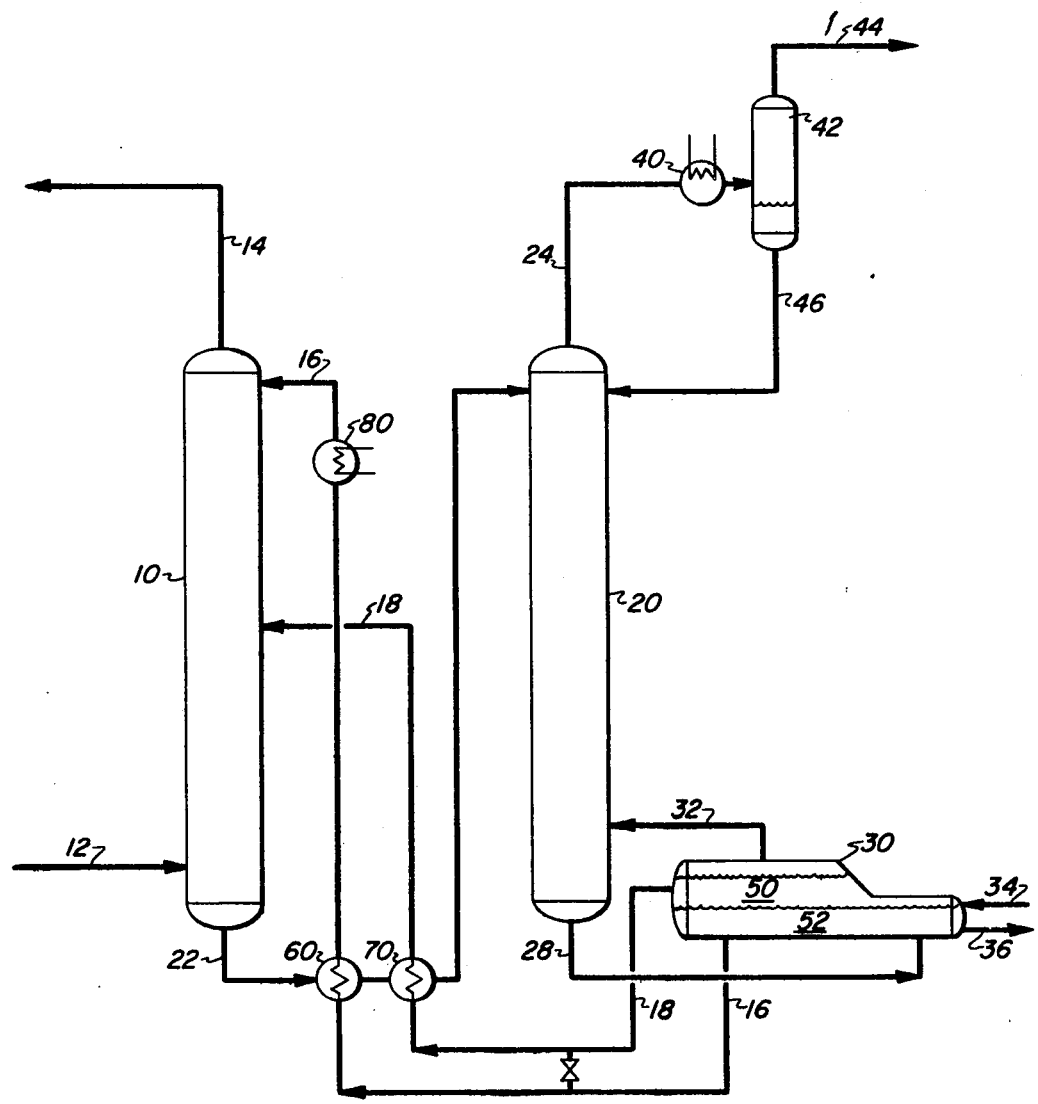

Referring to the FIGURE, one embodiment for practicing the subject invention is shown. The gaseous feed, containing the acidic compound $CO_2$ and possibly other acidic compounds such as $CO_2$, $H_2S$, $SO_2$, $SO_3$, $CS_2$, HCN, COS and oxygen and sulfur derivatives of $C_1$ to $C_4$ hydrocarbons, enters the base of a contacting zone, such as absorber 10, through line 12. Absorbers are old and well-known in the art. Absorber 10 should be designed to insure good contact between the gaseous feed and the absorbing or scrubbing solution. Frequently, absorber 10 comprises a tower filled with conventional ceramic packing or a tower having bubble cap plates or sieve plates. Still other absorbers are bubble reactors. The gaseous feed passes upwardly through absorber 10, with the treated gas exiting the absorber 10 through line 14. During its upward movement through absorber 10, the gaseous feed is contacted by countercurrently flowing lean absorbing solution entering the absorber through line 16 disposed at a first location preferably at or near the top of the absorber. As used herein, the term "lean" refers to a solution having a relatively low ratio of alkali bicarbonate to alkali carbonate.

A second absorbing solution stream, containing a relatively higher ratio of alkali bicarbonate to alkali carbonate enters absorber 10 through line 18 at a second location, the second location disposed below the first location on the absorber for contact with, and removal of the acidic compound from the upwardly flowing gaseous feed. The scrubbing solution from lines 16 and 18 passes downwardly through absorber 10 removing substantial quantities of the acidic compound from the upwardly flowing gaseous feed and exits the absorber through line 22. This solution containing the absorbed acidic compound, enters a regeneration zone, such as regenerator 20 and reboiler 30. Regenerators are old and well-known in the art. The design of regenerator 20 should ensure good vapor-liquid contact. Frequently, the overall design of regenerator 20 is similar to that of absorber 10. Regenerator 20 is generally maintained at a lower pressure than absorber 10. The vaporized acid gas exiting regenerator 20 through line 24 passes through heat exchanger 40, knock out pot 42, and line 44 for subsequent treatment (not shown). Condensibles from knock out pot 42 are returned to regenerator 20 through line 46. The partially desorbed solution passes downwardly through regenerator 20 and exits through line 28 at the bottom of the regenerator for transfer to reboiler 30. Reboiler 30, equipped with an external source of heat, such as steam flowing through inlet line 34 and return line 36, vaporizes a portion of this solution. The vapor is returned to regenerator 20 through line 32, while the liquid, which has been steam stripped, is separated into a lower liquid phase having a relatively low bicarbonate to carbonate ratio 52 which is returned to absorber 10 at a point at or near the top through line 16, and an upper phase 50 having a relatively high bicarbonate to carbonate ratio which is returned through line 18 to the absorber at a point below the lower liquid phase, and, preferably near the absorber mid-point. In this embodiment reboiler 30 should be designed to permit decantation of the scrubbing solution into upper liquid phase 50 and lower liquid phase 52. However, it is within the contemplation of the invention that the separation of the scrubbing solution into upper and lower liquid phases also could occur external to reboiler 30, such as by the addition of a decantation zone (not shown). Heat exchangers 60, 70, and 80 preferably are incorporated into the scrubbing system to improve performance. However, these exchangers are not essential to the successful practice of this invention. Exchangers 60, 70 disposed in lines 16, 18, respectively, preheat the scrubbing solution in line 22 to improve the desorption in regenerator 20. Heat exchanger 80 is used to cool the scrubbing solution in line 16 to further reduce the residual $CO_2$ content of the exit treated gas.

The scrubbing solution utilized comprises an aqueous solution of an alkali metal salt or alkali metal hydroxide and a sterically hindered amine. As used herein the term "sterically hindered amine" is defined as those compounds containing at least one secondary amino group attached to either a secondary or tertiary carbon atom or a primary amino group attached to a tertiary carbon atom. Nonlimiting examples of sterically hindered amines and scrubbing solutions incorporating certain of the amines are listed in U.S. Pat. No. 4,112,050, the disclosure of which is incorporated herein by reference. Among the preferred amines are: N-cyclohexyl-1,3-propanediamine; 1,8-p-menthanediamine; 1,7-bis-sec-butyldiethylenetriamine; 2,2,5,5-tetramethyl diethylenetriamine; 3-amino-3-methyl-1-butanol; 2-amino-2-methyl-1propanol; $N_1$-isopropyl-2-methyl-1,2-propanediamine; $N_1$(1,1-dimethyl-2-hydroxy-ethyl)-2-methyl-1,2-propanediamine; and $N_1$-isopropyl-$N_2$-(3-aminopropyl)-2-methyl-1,2-propanediamine, with the most preferred being N-cyclohexyl-1,3,propanediamine (CHPD). Among the preferred alkali metal salts is potassium carbonate. A scrubbing solution incorporating the above-noted preferred materials typically will have an average composition of 15 to 35 wt.% $K_2CO_3$, about 3 to 15 wt.% CHPD and about 50–80 wt.% water.

Typically the temperature in absorber 10 ranges between about 25° and about 150° C. and preferably is within the range of 35°–125° C. The pressure may range from about 5 to about 2000 psig, and preferably is in the range of about 200–1000 psig. The actual pressure of absorber 10 will in general be about the same as the pressure of the untreated gas. The temperature of absorber 10 is determined by many variables including solution composition, acid gas pickup, and acid gas clean-up requirements. When the scrubbing solution comprises an aqueous N-cyclo-hexyl-1,3-propanediamine/potassium carbonate solution, the temperature at the top of absorber 10 typically ranges between about 55° C. and about 85° C., while the pressure at the top ranges between about 200 and 1000 psig. The partial pressure of the acid gas, e.g. $CO_2$ in the feed entering through line 12 frequently may range between 0.1 to about 500 psia and often is in the range of about 1 to 400 psia. When a CHPD-potassium carbonate scrubbing solution is used, the temperature in regenerator 20 will range from about 100° C. to about 145° C. and preferably between about 105° and 130° C., while the pressure in the regenerator may range from about 17 to 55 psia, and preferably about 20 to 30 psia. When this scrubbing solution is used the temperature in reboiler 30 normally is within the range of about 105° to 150° C. preferably about 110° to about 135° C., while the pressure is within the range of about 17 to about 60 psia, preferably about 20 to about 30 psia. The scrubbing solution normally is regenerated when at least 80%, and preferably at least 90% of the absorptive capacity has been depleted. The absorptive capacity of the scrubbing solution is based upon the capacity of the dissolved alkali metal salt e.g. potassium carbonate, for reacting with the acidic compound, such as carbon dioxide, as well as the capacity of the sterically hindered amine for reacting with carbon dioxide. The regeneration is accomplished by conventional means, such as pressure reduction, which causes the acidic compounds to flash, and/or by passing an inert gas such as air, nitrogen or steam up through regenerator 20 countercurrent to the downflowing liquid solution. Typically heat exchanger 40 and knock-out pot 42 are added to remove condensibles exiting line 24 and return these to regenerator 20 through line 46 although these items are not essential to the successful practice of this invention.

In the embodiment shown, downwardly flowing partially desorbed scrubbing solution exits regenerator 20 through line 28 for transfer to reboiler 30. In reboiler 30 a portion of the scrubbing solution is vaporized and is returned to regenerator 20 through line 32. By regulation of the $CO_2$ content of the solution and the reboiler temperature, the scrubbing solution entering reboiler 30 can be forced to form two liquid phases: an upper liquid phase relatively rich in potassium bicarbonate and in the sterically hindered amine and a lower liquid phase relatively lean in potassium bicarbonate and amine.

The operation of absorber 10 is dependent, in part, on having adequate flow rates of scrubbing solution entering the absorber through lines 16 and 18. Preferably about 10 to about 30 wt.% of the scrubbing solution should enter the absorber through line 16 with the balance entering through line 18. Thus, it is within the contemplation of this invention that portions of the lower liquid phase also could be directed into absorber 10 through line 18 or that portions of the upper liquid phase could be directed into the absorber through line 16. The relative amounts of upper liquid phase 50 and lower liquid phase 52 in reboiler 30 will be dependent in part on the solution composition, and the degree of desorption. As indicated in Examples 1 and 2 hereinafter, similar scrubbing solutions may result in widely differing weight fractions in the upper and lower liquid phases if the degree of stripping is varied.

Table I illustrates that the scrubbing solution in reboiler 30 may be controlled as a one phase liquid or two phase liquid by adjustment of the following variables: reboiler temperature, concentration of sterically hindered amine, and degree of desorption of the alkaline material.

TABLE I

| Run No. | Wt. % $K_2CO_3$ | Wt. % CHPD | Temp. °C. | Overall Fraction of $K^+$ Present as $KHCO_3$ | Number of Phases |
|---|---|---|---|---|---|
| 1 | 25 | 7.4 | 115 | 0.23 | 1 |
| 2 | 25 | 7.4 | 121 | 0.23 | 2 |
| 3 | 25 | 7.4 | 121 | 0.50 | 1 |
| 4 | 25 | 14.7 | 121 | 0.23 | 2 |
| 5 | 25 | 14.7 | 121 | 0.60 | 1 |
| 6 | 30 | 7.4 | 121 | 0.23 | 2 |
| 7 | 30 | 7.4 | 121 | 0.60 | 1 |

The residual concentration or "leakage rate" of acidic compound in the exiting treated gas is largely dependent upon the equilibrium vapor pressure of the acidic compounds in the solution. Thus, contacting the gaseous feed containing an acid compound with a scrubbing solution having a reduced level of the acidic compound therein will result in the exiting treated gas having a reduced residual acidic compound concentration. As indicated in the following examples by contacting the gaseous mixture containing acidic compounds first with scrubbing solution having a relatively high potassium bicarbonate to potassium carbonate ratio followed by contacting with scrubbing solution having a relatively low potassium bicarbonate to potassium carbonate ratio, the concentration of $CO_2$ in the scrubbed gas is reduced below that which would result if the acid containing gaseous feed were contacted with scrubbing solution which has not first been phase separated.

EXAMPLE I

Table II below illustrates the composition of a typical scrubbing solution and the residual $CO_2$ concentration in the treated exit gas. In the single phase process of the prior art, the scrubbing solution from the reboiler would be added to the absorber at the top and mid-point but without liquid phase separation. In the two phase process the scrubbing solution is phase separated with the resulting liquid phases added to the absorber in a manner similar to that previously described and shown in the FIGURE. As previously indicated, phase separation of the at least partially desorbed scrubbing solution and addition of the phase having a relatively low potassium bicarbonate to potassium carbonate ratio above the phase having a relatively high potassium bicarbonate to potassium carbonate ratio reduces the residual acidic compound concentration in the treated gas.

TABLE II

| | Scrubbing Solution Composition (wt. %) | | |
|---|---|---|---|
| | Single Phase Process | Two Phase Process | |
| Component | | Upper Liquid Phase | Lower Liquid Phase |
| $KHCO_3$ | 5.9 | 8.3 | 3.8 |
| $K_2CO_3$ | 24.4 | 19.2 | 28.9 |
| CHPD | 6.2 | 12.4 | 1.0 |
| $H_2O$ | 63.5 | 60.1 | 66.3 |
| Fraction of K present as $KHCO_3$ | 0.14 | 0.23 | 0.08 |
| Fraction of Phase | 1.00 | 0.46 | 0.54 |

The exiting treated gas from absorber 10 was determined to have a residual $CO_2$ concentration of 120 parts per million by volume (VPPM) utilizing the conventional one-phase process, but only 70 VPPM if the scrubbing solution is separated into two liquid phases and recirculated as described hereinabove. These results were obtained for a 600 psia absorber pressure.

EXAMPLE II

Table III below illustrates a scrubbing system generally similar to that previously described in Example I but in which the solution was more completely regenerated. Here also it should be noted that the residual $CO_2$ concentration calculated from previously generated vapor-liquid equilibrium curves will be less when the leaner, lower liquid phase is added near the top of the absorber and the upper liquid phase is added near the absorber midpoint.

TABLE III

| Component | Scrubbing Solution Composition (wt. %) | | |
|---|---|---|---|
| | Single Phase Process | Two Phase Process | |
| | | Upper Liquid Phase | Lower Liquid Phase |
| $KHCO_3$ | 4.4 | 11.6 | 2.4 |
| $K_2CO_3$ | 26.2 | 9.2 | 31.1 |
| CHPD | 6.0 | 26.0 | NIL |
| $H_2O$ | 63.4 | 53.2 | 66.5 |
| Fraction of K present as $KHCO_3$ | 0.11 | 0.46 | 0.65 |
| Fraction of Phase | 1.00 | 0.23 | 0.77 |

The exiting treated gas was determined to have a residual $CO_2$ concentration of 70 VPPM when the scrubbing solution was not phase separated, but only 35 VPPM when the liquid was phase separated as previously described. These results also were obtained for a 600 psia absorber pressure.

Thus it may be seen that separation of the scrubbing solution into a lower liquid phase having a relatively low potassium bicarbonate to potassium carbonate ratio, and an upper liquid phase having a relatively high ratio of potassium bicarbonate to potassium carbonate and a relatively high concentration of sterically hindered amine, and the subsequent addition of the lower liquid phase to the absorber at a point above the addition point of the upper liquid phase, results in reduced acidic compound concentration in the existing treated gas.

In a typical commercial scrubbing system having 40,000 standard cubic foot per minute (SCFM) of inlet feed gas with 8 vol% of $CO_2$ therein passing upwardly through a packed type absorber 6 feet in diameter and about 60 feet high maintained at a top temperature of 80° C. and 600 psia, it is anticipated that a scrubbing solution comprising 6 wt.% CHPD, 30 wt.% $K_2CO_3$ and 64 wt.% water would reduce the concentration of $CO_2$ in the treated exit gas to 70 VPPM if the scrubbing solution is separated into two liquid phases which were then passed through the absorber as previously described at a total flow rate of 750 GPM. Of this total flow rate, approximately 20% would comprise the lower liquid phase added at or near the top of the absorber, while the remainder would be added near the absorber mid-point. The scrubbing solution exiting from the absorber typically will have absorbed about 99+% of the $CO_2$ in the inlet gas which is approximately 4 SCF of $CO_2$ per gal of scrubbing solution. This solution then is transferred to a regenerator, such as a packed tower 7 feet in diameter and about 60 feet high operated at a temperature of 115° C. and 10 psia to at least partially strip off the absorbed $CO_2$. The scrubbing solution then is transferred to a shell and tube reboiler in which the solution is more completely stripped and decanted into two liquid phases for return to the absorber.

Although the subject process has been described with reference to a specific embodiment, it will be understood that it is capable of further modification. Any variations, uses or adaptations of the invention following, in general, the principles of the invention are intended to be covered, including such departures from the present disclosure as come within known or customary practice in the art to which the invention pertains and as may be applied to the essential features hereinbefore set forth, and as fall within the scope of the invention.

What is claimed is:

1. A process for at least partially removing carbon dioxide from a gaseous feed including carbon dioxide comprising:
   (a) contacting the gaseous feed in a contacting zone with a scrubbing solution comprising:
       (i) an alkaline material selected from the class consisting of alkali metal salts and alkali metal hydroxides; and
       (ii) a sterically hindered amine to thereby at least partially absorb the carbon dioxide from the gaseous feed;
   (b) passing the scrubbing solution containing the absorbed carbon dioxide from the contacting zone into a regeneration zone wherein the scrubbing solution is at least partially desorbed;
   (c) separating the at least partially desorbed scrubbing solution into an upper liquid phase having a relatively high alkali bicarbonate to alkali carbonate ratio and a lower liquid phase having a relatively low alkali bicarbonate to alkali carbonate ratio; and,
   (d) directing at least a portion of the lower liquid phase into the contacting zone at a first location and at least a portion of the upper liquid phase into the contacting zone at a second location, the second location disposed below the first location in the contacting zone.

2. The process of claim 1 wherein the concentration of sterically hindered amine is higher in the upper liquid phase than in the lower liquid phase.

3. The process of claim 1 wherein the contacting zone comprises an absorber, the carbon dioxide being at least partially absorbed in the absorber by the scrubbing solution.

4. The process of claim 3 wherein the regeneration zone comprises a regenerator and reboiler, the scrubbing solution passing from the absorber into the regenerator and from the regenerator into the reboiler, the scrubbing solution being at least partially desorbed in the regenerator and reboiler.

5. The process of claim 4 wherein the separation of the at least partially desorbed scrubbing solution into an upper phase relatively rich in sterically hindered amine and having a relatively high alkali bicarbonate to alkali carbonate ratio and a lower liquid phase having a relatively low alkali bicarbonate to alkali carbonate ratio is effected in the reboiler.

6. The process of claim 5 wherein the sterically hindered amine is selected from the class consisting of N-cyclohexyl-1,3-propanediamine; 1,8-p-methanediamine; 1,7-bissecbutyl-diethylenetriamine; 2,2,5,5-tetramethyl diethylenetriamine; 3-amino-3-methyl-1-butanol; 2-amino-2-methyl-1-propanol; $N_1$-isopropyl-2-methyl-1,2-propanediamine; $N_1$(1,1-dimethyl-2-hydroxyethyl)-2-methyl-1,2-propanediamine; and $N_1$-isopropyl-$N_2$-(3-amino-propyl)-2-methyl-1,2-propanediamine.

7. The process of claim 6 wherein the alkaline material is selected from the class consisting of potassium hydroxide, potassium carbonate, sodium hydroxide, and sodium carbonate.

8. The process of claim 6 wherein the scrubbing solution comprises about 3 to about 15 wt.% sterically hindered amine, about 15 to about 35 wt.% alkaline material and about 50 to about 80 wt.% water.

9. The process of claim 8 wherein the sterically hindered amine is N-cyclohexyl-1,3-propanediamine.

10. The process of claim 9 wherein the alkaline material comprises potassium bicarbonate.

11. A process for at least partially removing $CO_2$ from a gaseous feed including $CO_2$ comprising:
   (a) contacting the gaseous feed in an absorber with a scrubbing solution comprising:
      (i) about 3 to about 15 wt.% of a sterically hindered amine;
      (ii) about 15 to about 35 wt.% of an alkaline material selected from the class consisting of alkali metal salts and alkali metal hydroxides; and
      (iii) about 50 to about 80 wt.% of water to thereby at least partially absorb the acidic compound;
   (b) passing the scrubbing solution containing the absorbed $CO_2$ from the absorber into a regenerator wherein the scrubbing solution is at least partially desorbed;
   (c) passing the at least partially desorbed scrubbing solution from the regenerator into a reboiler, wherein the at least partially desorbed scrubbing solution is separated into an upper liquid phase relatively rich in sterically hindered amine and having a relatively high ratio of alkali bicarbonate to carbonate ratio and a lower liquid phase having a relatively low ratio of alkali bicarbonate to carbonate ratio; and
   (d) directing at least a portion of the lower liquid phase from the reboiler into the absorber at a first location and directing at least a portion of the upper liquid phase from the reboiler into the absorber at a second location, the second location disposed below the first location.

* * * * *